Figure 1:
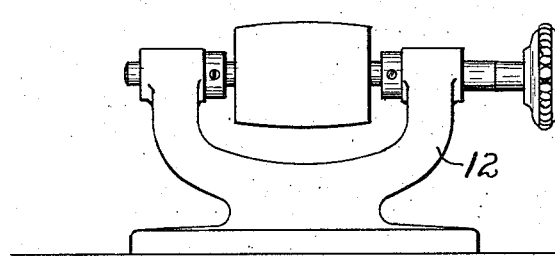

B. F. DINGLEY.
ROTARY BURNISHING TOOL.
APPLICATION FILED SEPT. 3, 1909.

1,010,127.

Patented Nov. 28, 1911.
2 SHEETS—SHEET 1.

WITNESSES
INVENTOR
Benjamin F. Dingley.
BY Howard E Barlow
ATTORNEY

B. F. DINGLEY.
ROTARY BURNISHING TOOL.
APPLICATION FILED SEPT. 3, 1909.

1,010,127.

Patented Nov. 28, 1911.

2 SHEETS—SHEET 2.

WITNESSES
Willard W. Barkley.
E. I. Ogden

INVENTOR
Benjamin F. Dingley.
BY Howard E. Barlow
ATTORNEY

UNITED STATES PATENT OFFICE.

BENJAMIN F. DINGLEY, OF SILVER SPRING, RHODE ISLAND, ASSIGNOR TO ERNEST C. BAKER, OF PROVIDENCE, RHODE ISLAND.

ROTARY BURNISHING-TOOL.

1,010,127.      Specification of Letters Patent.      Patented Nov. 28, 1911.

Application filed September 3, 1909. Serial No. 516,028.

*To all whom it may concern:*

Be it known that I, BENJAMIN F. DINGLEY, a citizen of the United States, residing at Silver Spring, in the county of Providence and State of Rhode Island, have invented certain new and useful Improvements in Rotary Burnishing-Tools, of which the following is a specification, reference being had therein to the accompanying drawing.

This invention relates to rotary burnishing tools and has for its object to provide a simple and inexpensive device which is adapted to be readily applied to a speed lathe head or other similar speeding device and rotated at a high velocity for the purpose of providing a rotary burnisher for jewelry, metal ware, or other articles on which it might be adapted to operate to produce the burnishing effect with great rapidity.

The burnishing of the high lights or raised portions of jewelry or other metal ware has heretofore usually been done by a hand operated rubbing tool, which process was comparatively slow, tedious, unsatisfactory in many cases, and necessarily expensive, and the desired effect could not be produced in a practical way on many classes of goods by this primitive method.

In order to obviate the above difficulty and reduce to a minimum the time and labor necessary for producing the desired result I have provided a mechanically operated tool that is provided with balls or rounded surfaces slightly protruding from its face or periphery, so that when the work to be finished is brought in contact with the highly polished surface of said rapidly revolving balls or surfaces the combination hammering and rubbing action quickly produces the effect of an extremely high quality of hand burnished work.

My improved burnishing tools may be made in any desired shape or form, such as cylinders, cones, hemispheres, disks, or any other convenient shape or shapes as may be necessary or found advantageous to operate upon work of different styles and character.

My preferred method of forming this polishing tool is to loosely mount highly polished-faced balls which will slightly protrude from the surface of the same. I do not restrict myself, however, to the mounting of the balls loosely on the face of the tools, as the balls may be secured firmly therein, if desired.

The invention consists of other novel features and parts and combinations of the same as will be fully described hereinafter and then pointed out in the appended claims.

A practical embodiment of the invention is represented in the accompanying drawings, forming a part of this specification, in which similar characters of reference indicate corresponding parts in all the views.

Figure 4:
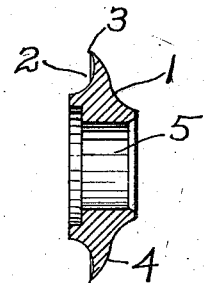
Figure 3:
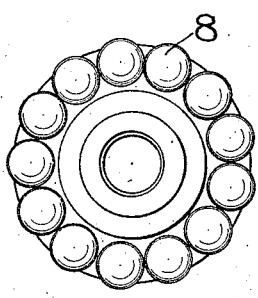
Figure 2:
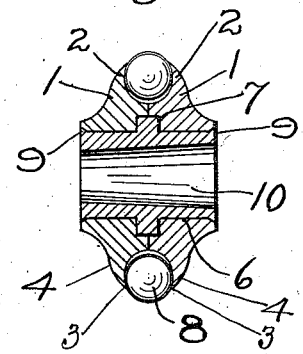
Figure 5:
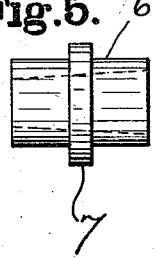
Figure 6:
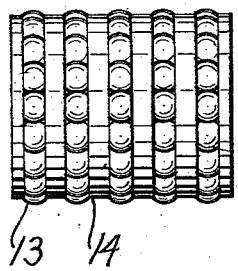
Figure 7:
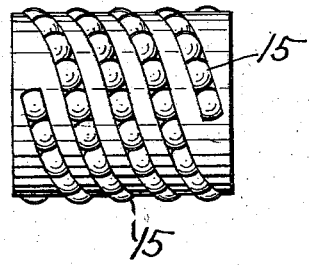
Figure 8:
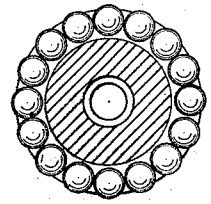
Figure 9:
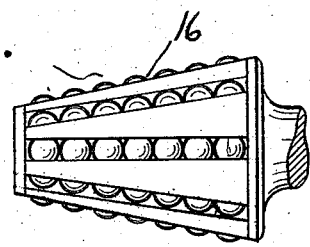
Figure 10:
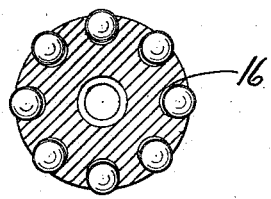
Figure 11:
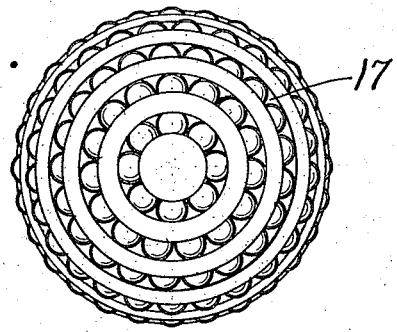
Figure 12:
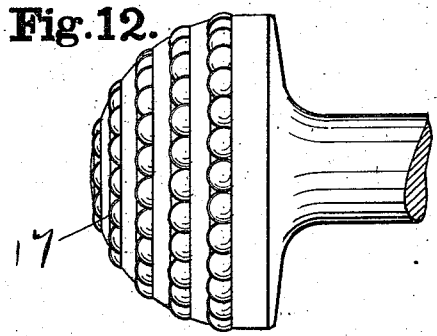
Figure 13:
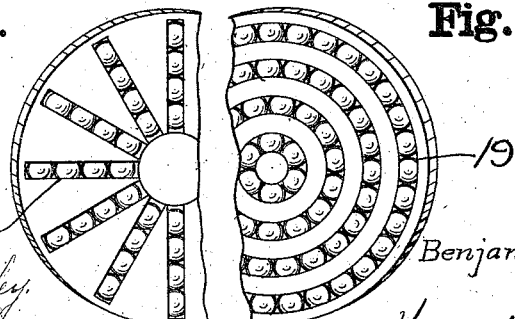
Figure 14:
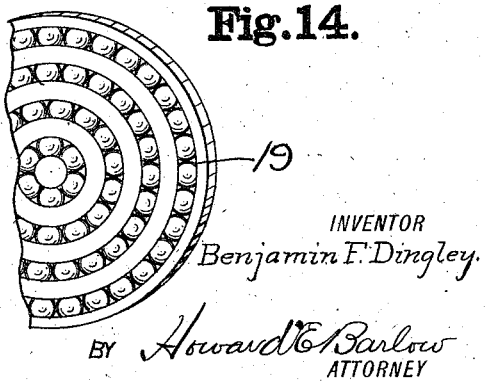

In the drawings: Figure 1— illustrates a speed lathe head with a disk form of burnisher having balls on its periphery mounted thereon. Fig. 2— is a transverse section through the tool showing the balls held in the raceway and one means by which the two disks or side plates are held in position. Fig. 3— is a side elevation of the burnisher showing the device with one of its sides or retaining disks removed. Fig. 4— is a detail of one of the disks or side plates. Fig. 5— shows a central tubular hub illustrating a simple and effective means for securing the side plates or disks together. Fig. 6— shows a burnishing tool of cylindrical form having balls mounted in concentric circles around its surface. Fig. 7— shows a similar shaped tool having balls mounted in helical shaped grooves on its surface. Fig. 8— is a section of the cylinder through one of the grooves. Fig. 9— shows a cone-shaped tool having balls set in longitudinal grooves. Fig. 10— is a sectional view of the cone. Fig. 11— is a face view of a hemispherical tool showing balls set in its surface. Fig. 12— is a side elevation of the same. Fig. 13— shows a disk with radial slots containing protruding balls. Fig. 14— shows a disk having concentric circles in which the balls are located.

Referring to the drawings 1—1 in Fig. 2 designate the two ball race members preferably employed in the construction of a disk-shaped burnisher tool having balls loosely mounted in a raceway in its outer edge or periphery. These members are preferably made of steel either pressed, drop-forged, or turned from solid stock, into the desired shape and hardened to withstand the wear of the rapidly revolving balls mounted therein. These members are each provided near their periphery with grooves 2—2 as shown in Fig. 4 near their periphery leaving an opening between them through which the outer surface of the balls may project. The outer edges 3 of these members are turned inward to retain the balls in the raceway and are preferably formed very thin and on a sharp receding angle as at 4 so as not to interfere with the movement of the work about the tool while in the operation of burnishing. A simple and effective way of securing these two members together is to provide a central bore 5 in each into which a tubular hub 6, see Fig. 5, is set, a central collar 7 being formed on the hub to assist in positioning the members. After the balls 8 have been positioned in the raceway the outer end of this hub may then be riveted as at 9, see Fig. 2, permanently securing the whole together.

The central hub 6 is preferably provided with a tapering hole 10 through it whereby the whole device is adapted to be readily mounted on a corresponding tapering spindle 11 on the lathe head 12 whereby this tool may receive a rapidly rotating motion. Instead of the balls being mounted on the edge of a disk they may be set in concentric grooves 13 in the face of a cylinder 14, see Fig. 6, which may be of any desired length or diameter, the same being adapted to burnish flat or slightly curved large figured surfaces. Or in some instances the balls may be set in helical grooves 15, as illustrated in Fig. 7, or arranged in any other manner. Then again, in some cases a cone-shaped burnishing tool may be required having longitudinal grooves 16 in which the balls may be set, as in Figs. 9 and 10. In other cases, such as for burnishing the inner surface of bowls, cups or the like, a tool of hemispherical or oval shape is found convenient having balls set in concentric grooves 17 or in any other manner over its face. Disks, such as those illustrated in Figs. 13 and 14, having radial grooves 18 or circular concentric grooves 19, are found advantageous for burnishing the raised portions of large flat surfaces.

It is found in practice when operating the cylindrical or disk-shaped burnishing tools having the balls mounted on their periphery that owing to centrifugal force the balls press outward against the thin outer edges or lips of the groove and when the work is pressed against the highly polished rapidly moving surfaces of the balls the effect of hand polished work is almost instantly produced. Another feature of this form of burnishing tool is that owing to the outward pressure and a slight looseness of the balls in their raceway said balls when coming in contact with the work have a tendency to yield slightly and so produce a soft or resilient combination rubbing and hammering effect, which action produces the effect of the very highest quality of hand burnished work.

The degree of yielding or resiliency of the hammering stroke of the engaging balls in the rapidly revolving tool may be varied by increasing or diminishing the velocity of the rotating instrument.

While in most cases the balls mounted loosely in grooves are found to be most effective yet in other instances balls set and fixed permanently around the face of a burnishing tool are found to produce excellent results.

Having thus described my invention, what I claim as new and desire to secure by Letters Patent, is:

1. A rotary burnishing tool comprising a casing, means in the surface of said casing for receiving and retaining a plurality of balls so that a portion of said balls will protrude beyond the surface of said casing, and said casing being adapted to be rapidly rotated.

2. A rotary burnishing tool comprising a body portion provided with one or more grooves adapted to receive and retain a plurality of balls, a portion of each ball being arranged to project beyond the surface of said body, said body being adapted to be rapidly rotated.

3. A rotary burnishing tool comprising a body portion constructed of two side plates provided with grooves which when placed together form a raceway adapted to receive and retain a plurality of balls, a portion of each ball being arranged to project beyond the surface of said body, and means for retaining said side plates together the whole being adapted to be rapidly rotated.

In testimony whereof I affix my signature in presence of two witnesses.

BENJAMIN F. DINGLEY.

Witnesses:
 HOWARD E. BARLOW,
 E. I. OGDEN.